United States Patent [19]

Hofmeister

[11] Patent Number: 5,727,690
[45] Date of Patent: Mar. 17, 1998

[54] METHOD AND APPARATUS FOR PROCESSING LEAFY VEGETABLES

[76] Inventor: William M. Hofmeister, 11805 Cedardale Rd., Anchorage, Ky. 40223

[21] Appl. No.: 539,430

[22] Filed: Oct. 5, 1995

[51] Int. Cl.⁶ .................................................. B07B 4/00
[52] U.S. Cl. ........................................ 209/139.1; 209/147
[58] Field of Search ............................ 209/28, 29, 133, 209/138, 139.1, 140, 141, 142, 146, 152, 147; 99/544, 545, 547, 548

[56] References Cited

U.S. PATENT DOCUMENTS

| | | | |
|---|---|---|---|
| 1,661,299 | 3/1928 | Peron | 209/29 |
| 3,126,930 | 3/1964 | Vosti et al. | 99/538 |
| 3,618,761 | 11/1971 | Francis et al. | 209/37 |
| 4,168,597 | 9/1979 | Cayton | 53/127 |
| 4,278,532 | 7/1981 | Birch et al. | 209/152 X |
| 4,453,458 | 6/1984 | Altman | 99/544 |
| 4,787,305 | 11/1988 | Kesson | 99/538 |
| 4,856,715 | 8/1989 | Fordyce | 241/5 |
| 4,889,241 | 12/1989 | Cogan et al. | 209/552 |
| 4,915,824 | 4/1990 | Surtee | 209/139.1 |
| 5,358,122 | 10/1994 | Surtees | 209/139.1 |
| 5,411,142 | 5/1995 | Abbott et al. | 209/139.1 X |
| 5,579,920 | 12/1996 | Garabedian et al. | 209/139.1 |

FOREIGN PATENT DOCUMENTS 1509130  9/1989  U.S.S.R. ............... 209/139.1

*Primary Examiner*—Tuan Nguyen
*Attorney, Agent, or Firm*—Middleton & Reutlinger; Charles G. Lamb

[57] ABSTRACT

In a processing line for processing a leafy vegetable, particularly lettuce, the leafy vegetable is cut into preselected sized pieces which includes high density cores, hearts, ribs, and veins, and low density desirable cut leaf. A gravity/air separation device is provided to separate the high density undesirable parts of the leafy vegetable from the low density desirable leafy vegetable material.

3 Claims, 5 Drawing Sheets

5,727,690

METHOD AND APPARATUS FOR PROCESSING LEAFY VEGETABLES

BACKGROUND OF THE INVENTION

The present invention relates to a method for processing leafy vegetables and more particularly to a method for separating desirable cut leafy vegetable products from undesirable leafy vegetable products.

In the processing of leafy vegetables and particularly lettuce, fresh heads of lettuce are transferred from a shipping container in which they are received into a staging hopper for transfer to an inspection area. At the inspection area the outer leaves which are generally wilted, decayed or off-color will be manually removed from the head and the core will then be manually cut out of the lettuce with the use of a cylindrically shaped cutter or knife. The removal of the cores, however, are time consuming, subjective and physically taxing for the de-coring employees. Moreover, the decoring of the lettuce varies from head to head depending upon the maturity of the head of lettuce wherein mature heads of lettuce typically have large, deep cores and also are irregular in shape. Thus, the use of a cylindrically shaped de-coring knife of a single diameter size cuts the same size core each and every time. And, for a mature head of lettuce the de-coring knife will not cut out all of the core, whereas for a less mature head of lettuce the de-coring knife cuts out a large portion of the good leafy product. Even further, the heavy rib and veins in the vegetable leaves are not removed in the decoring operation even though these parts are not desirable for eating. Also, a dense inner heart is not removed even though it is not desirable for eating either. The de-cored lettuce or other leafy vegetable may also include field rocks, pallet nails, and pallet wood within the folds of the leaves which may also then be transferred to a cutting device which cuts the de-cored lettuce head into preselected cut sizes, such as those cut sizes desirable for salads and the like.

SUMMARY OF THE INVENTION

It is an object of the present invention to provide an improved method for separating good leafy vegetable material from undesirable leafy vegetable material.

It is another object of the present invention to provide for the separation of cut leafy vegetable products by the use of a gravity/air separation device.

It is a further object of the present invention to provide a method for the separation of good or desirable leafy vegetable material from undesirable vegetable material product which results in a higher efficiency of desirable products.

It is also an object of the present invention to provide a leafy vegetable product of improved quality.

The present invention provides for a system for processing leafy vegetable products, particularly, lettuce wherein the fresh head lettuce is inspected and the outer leaves which are wilted, decayed or off-color are removed and the remaining head of lettuce, including the core, is then sent to a cutting device wherein the cutting device cuts the lettuce into preselected sized pieces such as a desired size for use in salads, and the like. The cut leafy vegetable is then transferred to a gravity/air separation device wherein the gravity/air separation device separates the good or desirable leaf material by density from vegetable pieces that are undesirable. For example, in the separation of desirable lettuce parts from the undesirable parts of a head of lettuce, the undesirable parts are more dense than the desired leafy parts. For example, the good leafy part of the cut lettuce will generally have a density of approximately 0.8 and a surface area weight of about 2.6 square inches per gram. The undesirable parts of the head of lettuce which include the core, the heavy rib, the heart and the veins are much denser. For example, the core will generally have an approximate density of 1.2 with the surface area per weight of about 0.3 square inches per gram; the heavy rib will have an approximate density of 1.1 with a surface area per weight of about 1.0 square inches per gram; the heart will have an approximate density of 1.0 with the surface area per weight of about 0.5 square inches per gram; and, the veins will have an approximate density of 0.9 with a surface area per weight of about 1.3 square inches per gram. Thus, the combination of low density and high surface area to weight ratio in the good or desirable parts of lettuce creates an ideal environment for gravity/air separation.

In the lettuce processing method of the present invention, the cut lettuce may be washed and dried prior to the gravity/air separation or the washing and drying may occur after the gravity/air separation. The washing and drying after the gravity/air separation is preferred since only the desired leafy product is then subject to washing and drying.

Accordingly, the present invention provides a vegetable processing system comprising:

means to transfer leafy vegetable from a container to an inspection station;

means to transfer the leafy vegetable from the inspection station to a vegetable cutter;

a vegetable cutter;

means to transfer cut vegetable from the vegetable cutter to a gravity/air separation device; and, a gravity/air separation device including means to separate, by density, undesirable cut vegetable pieces from desirable cut vegetable pieces.

These and other objects and advantages will become readily apparent to those skilled in the art from the following detailed description of the preferred embodiments of the present invention and from the drawings.

DETAILED DESCRIPTION OF THE PREFERRED EMBODIMENTS

Figure 1:
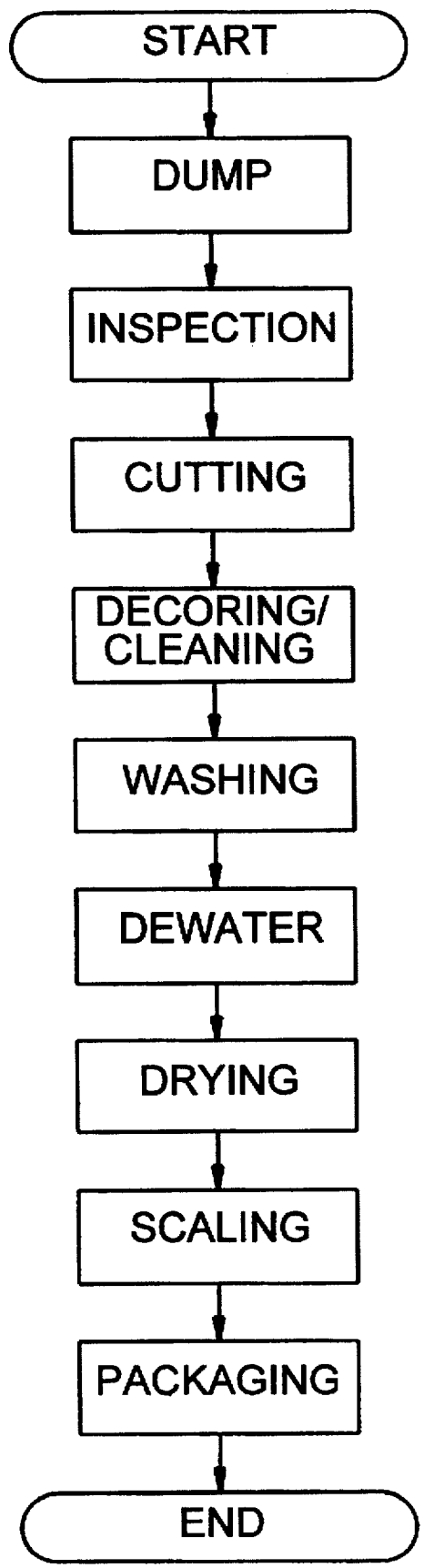
FIG. 1 is a block flow diagram of a preferred embodiment of the present invention.
Figure 2:
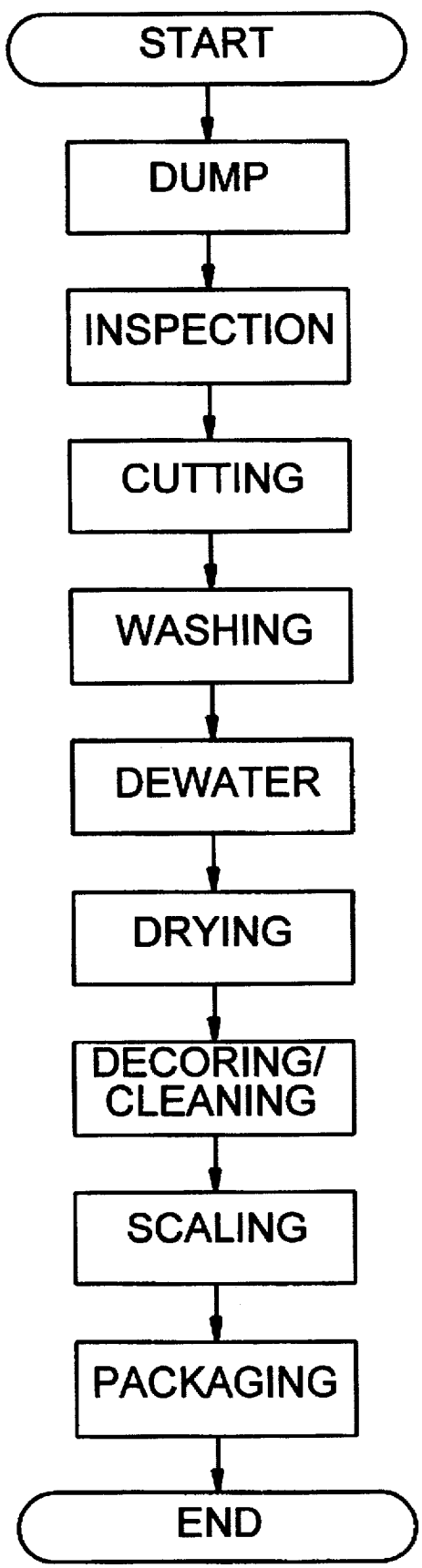
FIG. 2 is a block flow diagram of another embodiment of the present invention.
Figure 3:
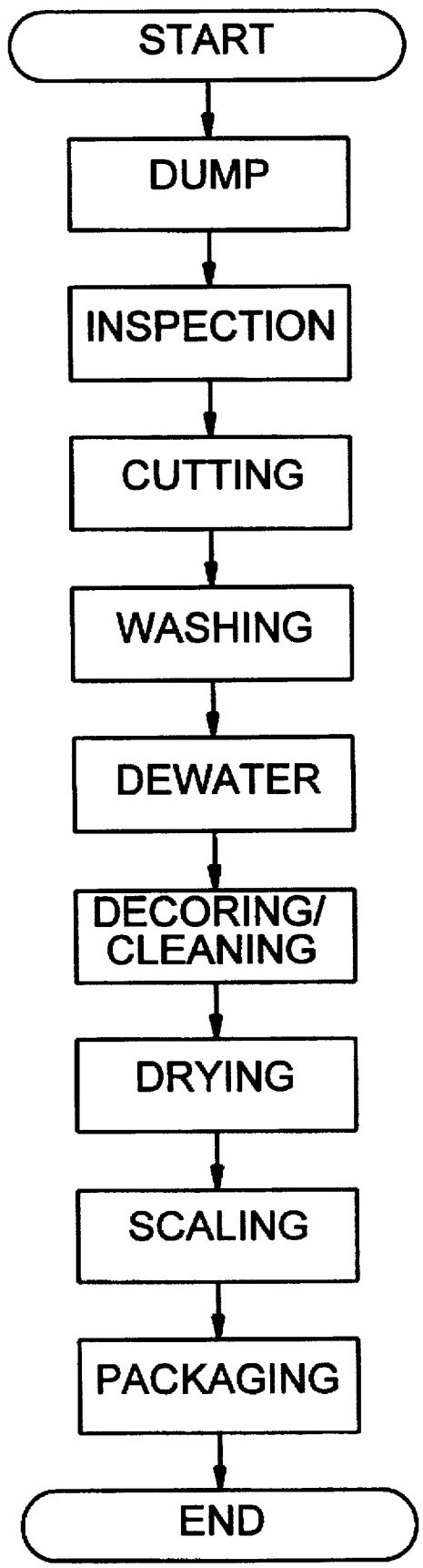
FIG. 3 is a block flow diagram of even another alternative embodiment of the present invention.

FIGS. 1, 2 and 3 are block diagrams showing the flow of three different processes for processing head lettuce in accordance with the present invention. In FIG. 1, the preferred embodiment of the present invention, a head of lettuce is received in stored containers and is then transferred to a storage hopper ("dump") where the head of lettuce is held until ready for use. The fresh head of lettuce from the "dump" is then transferred to an "inspection station" wherein the wilted, off-color and/or rotten outer leaves are then removed. The lettuce is then transferred to a "cutting operation" where the head of lettuce is cut into pieces of a preselected size. At the cutting station, all of the lettuce is cut. This includes both the desired product leafy portions as well as the undesirable and more dense core, heart, vein and rib portions. From the "cutting operation" the cut pieces of lettuce is transferred to a gravity/air separation device ("decoring/cleaning") wherein the heavy part of material, particularly the core, ribs, heart and veins which are more dense than the leafy desirable product, fall to the bottom of the gravity/air separation device and the lighter desirable cut lettuce parts are then airveyed to another location within the gravity/air separation device for transferring to washing means. The desirable product from the gravity/air separation device is then washed, generally with chilled water including sodium hypochlorite or other chlorine containing compound therein by any appropriate washing means, a flume being one preferred means and discussed hereinafter. After washing, the desired cut fresh leaf product is then subjected to a "dewater" step which generally includes a vibrating screen and is then caught in a porous bucket which is subjected to centrifugal action whereby the remaining water is removed through the pores of the basket as the basket is spun thereby "drying" the cut lettuce leaves. The dried cut lettuce is then transferred to a "scaling" step wherein the lettuce is weighed into a preselected weight and then transferred to a packaging machine wherein the fresh cut lettuce is then packaged for shipment.

FIGS. 2 and 3 are alternative embodiments of the present invention wherein the "washing", "dewater", and "drying" are steps performed in the process prior to the "decoring/ cleaning" step wherein the desired light weight fresh cut material is separated from the undesirable core, heart, ribs and veins. And, FIG. 3 differs from FIG. 2 in that the "drying" of the desired product occurs downstream from the "decoring/cleaning" step.

Figure 4:
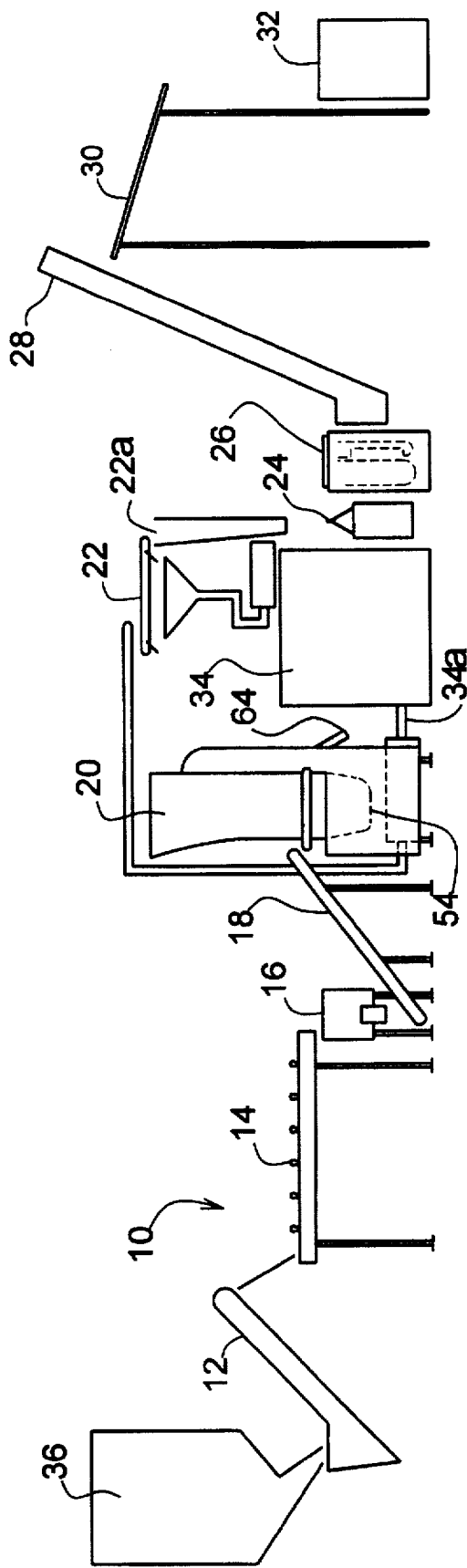
FIG. 4 is a schematic diagram of the preferred embodiment of FIG. 1.

Turning now to FIG. 4, FIG. 4 is an overall schematic process of the preferred embodiment including the steps as set forth in the block diagram of FIG. 1. In a lettuce processing system 10, a storage hopper 36 is provided to receive incoming fresh heads of lettuce and to store the heads of lettuce for further processing. The heads of lettuce from storage hopper 36 are removed by an endless belt conveyor 12 to an inspection station 14 which includes a "stop and go" conveyor. At the inspection station 14 the outer leaves, including those that are wilted, rotted or off color, are manually removed. After the lettuce has been inspected and the outer undesirable leaves removed, the "stop and go" conveyor of the inspection station 14 transfers the lettuce heads to a commercial cutting machine 16. (Any commercially available cutting machine such as those manufactured by the Urschel Company are acceptable). The entire head of lettuce is cut in the commercial cutter 16 into preselected sized pieces and the cut product discharging from the cutter 16 is caught on an inclined endless belt conveyor 18 and transferred to a gravity/air separator device 20. (A preferred gravity/air separator will be discussed further hereinafter). The cut heavy density material, particularly the core, heart, ribs and veins drop through the air stream in the gravity/air separation device 20 and are discharged out of the bottom 54. The desired product which includes the fresh cut leafy lettuce discharges from the gravity/air separation device through the discharge 64 into the discharge 34a of a flume 34 and the good lettuce is conveyed through flume discharge 34a or a wash system which utilizes chilled, chlorinated water to clean the lettuce. The water not only washes the undesirable particulates from the fresh lettuce leaf but also chills the leaf and kills any bacteria on the lettuce. The bulk of the water from the flume is separated from the lettuce and recycled for further use in the flume washing system. The material discharging from the washing system is discharged onto a vibrating screen conveyor 22 which removes a large portion of the water from the leaves through the shaking action of the vibrating screen and the dewatered lettuce product is then discharged through chute 22a into a porous basket 24. The porous basket 24, when full, is placed within a centrifuge 26 where the lettuce is subjected to centrifugal force to remove the rest of the water from the lettuce thereby producing an essentially dry lettuce product. When the basket 24 is removed from the centrifuge 26, the material is then placed into an inclined endless conveyor 28 and transferred to a weighing machine 30. (Any commercially available weighing machine, such as those manufactured by Powell Manufacturing are acceptable). The cut lettuce is then weighed into preselected amounts on the scale 30 and then transferred to a packaging machine 32 which may be any known in the art such as, for example, a Model 1200Z of CVP Corporation where the lettuce is then packaged for shipment.

Figure 6:
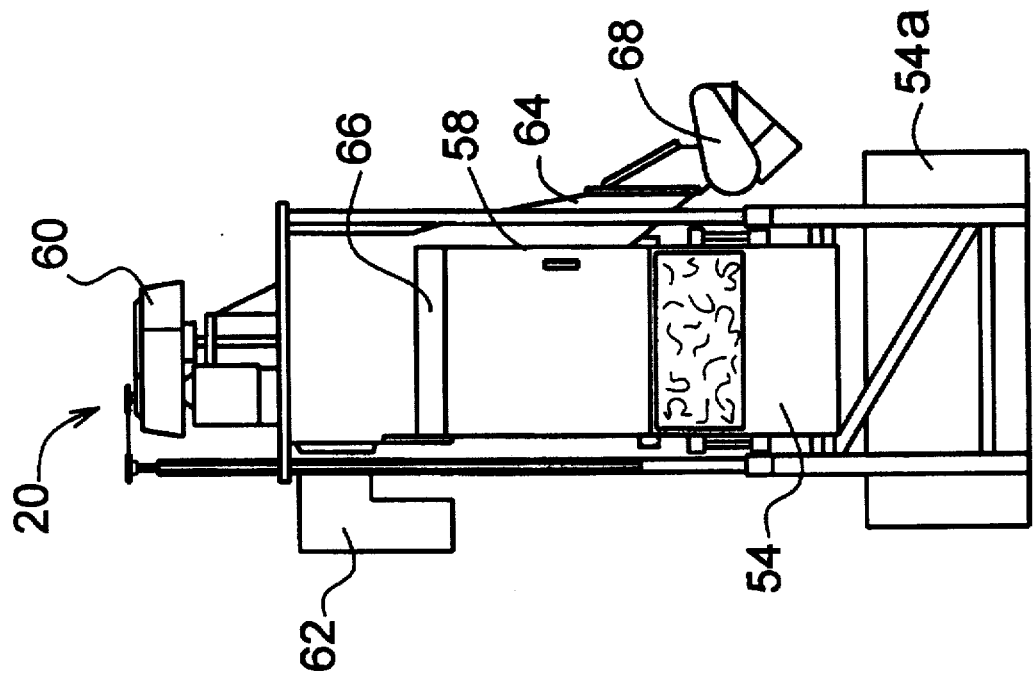
Figure 5:
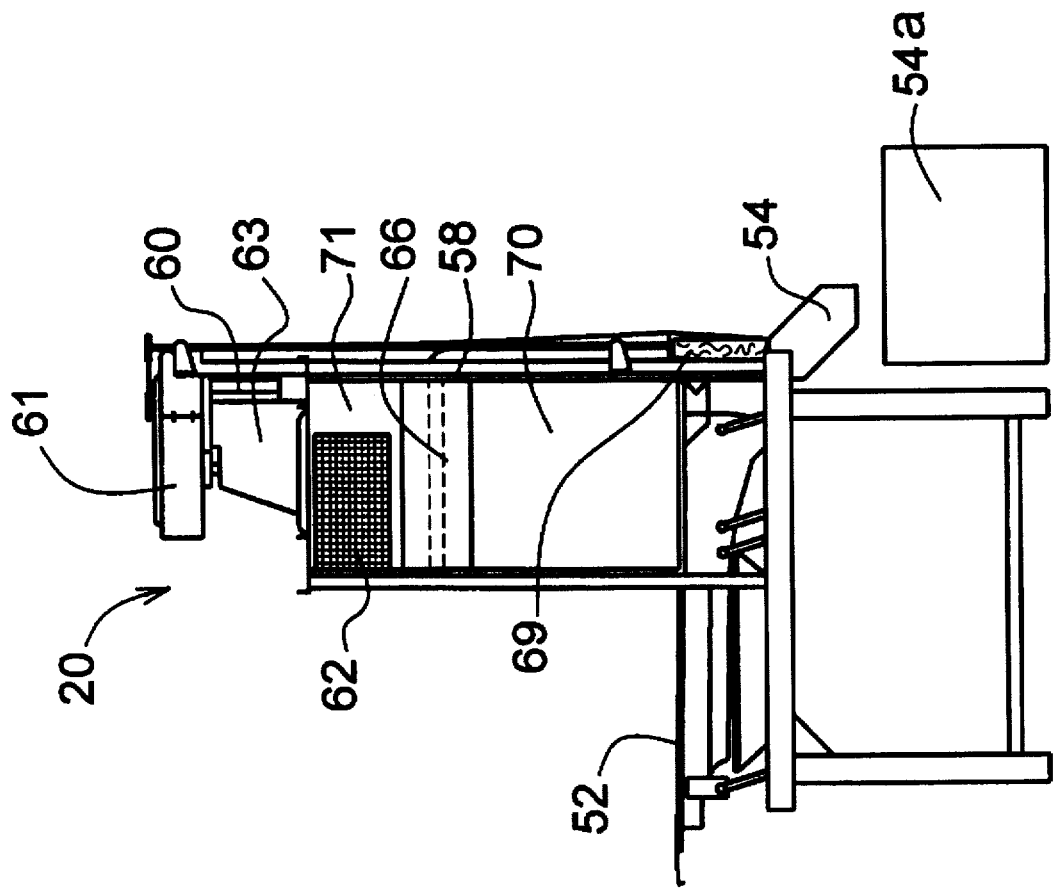
FIG. 5 is a front view of one gravity/air separation device of the present invention; and, FIG. 6 is an end view of the gravity/air separation device of FIG. 5.

FIGS. 5 and 6 show one preferred gravity/air separating device 20 used in the present invention. The gravity/air separating device 20, in accordance with FIGS. 5 and 6, includes a vibrating feed screen 52 disposed at about a right angle to a vertical housing 58 which receives fresh cut lettuce from the endless belt conveyor 18 (FIG. 4). An outlet hopper 54a is disposed beneath the vibrating feed screen 52 to receive any undesirable heavy material which may be caught in the head of lettuce. The outlet hopper 54a receives the cut out cores, hearts, ribs, and veins of the lettuce as well as other undesirable solids, such as nuts, bolts, pieces of wood and other types of material which have been found in the lettuce which have been picked up both from the field where the lettuce is grown as well as those solids which have been picked up during the transporting of the lettuce from the field to the processing plant.

The gravity/air separation device 20 includes a housing 58 which is divided into three compartments, the first or lower compartment being in the lower portion identified by the numeral 69 where the heavy or dense material such as the core, heart, ribs and veins and undesirable solids are removed through discharge outlet 54; expansion chamber 70 wherein the high velocity air flowing through the unit is reduced so that the light weight desirable lettuce product is caught in a discharge chute 64 (FIG. 6) which is an outlet from the expansion chamber 70; and, an upper portion 71 which houses a variable speed blower 60 in flow communication on its discharge side with an air and fines discharge outlet 62.

Near the terminating end of the discharge chute 64 is a rotary air lock 68 which provides for a seal of the expansion chamber 70 and also defines the rate of flow of lettuce out of the gravity/air separation device 20. And, the variable speed blower 60 includes a fan portion 61 and a variable speed drive 63. The variable speed blower 60 provides for the adjustment of the velocity of the air flowing from the gravity/air separation device 20 and thereby controls the amount of separation of desired products from undesired products. Disposed between the upper portion 71 and the expansion chamber 70 is a water spray discharger 66 which is utilized to carry product down the expansion chamber without bridging or plugging.

Even though only one preferred embodiment has been discussed in detail, it is realized that other advantages and modifications will become readily apparent to those skilled in the art from the foregoing description without departing from the scope and spirit of the present invention in accordance with the claims appended hereto.

What is claimed is:

1. An apparatus for separating high density vegetable pieces from low density vegetable pieces comprising:

a vertically extending housing having a lower portion and an upper portion with an expansion chamber disposed therebetween;

said lower portion including a product inlet and an undesirable product outlet, said product inlet including a vibrating feeder disposed at about a right angle to said vertical housing;

said expansion chamber having a desirable product outlet; and, said upper portion including an air exhaust means and a variable speed blower disposed therein and positioned to pull air into said housing through said product inlet and to force air out through said air exhaust means.

2. The apparatus of claim 1 including a water spray disposed between said expansion chamber and said upper portion.

3. In combination with a food processing line, an apparatus for separating high density vegetable pieces from low density vegetable pieces comprising:

a vertically extending housing having a lower portion and an upper portion with an expansion chamber disposed therebetween;

said lower portion including a product inlet and an undesirable product outlet, said product inlet including a vibrating feeder disposed at about a right angle to said vertical housing;

said expansion chamber having a desirable product outlet; and, said upper portion including air exhaust means and a variable speed blower disposed therein and positioned to pull air into said housing through said product inlet and to force air out through said air exhaust means.

* * * * *